United States Patent [19]

Ragaly

[11] Patent Number: 4,589,855
[45] Date of Patent: * May 20, 1986

[54] FORCED AIR-COOLED VEHICULAR-TYPE ALTERNATOR

[75] Inventor: Istvan Ragaly, Schwieberdingen, Fed. Rep. of Germany

[73] Assignee: Robert Bosch GmbH, Stuttgart, Fed. Rep. of Germany

[*] Notice: The portion of the term of this patent subsequent to Jul. 31, 2001 has been disclaimed.

[21] Appl. No.: 675,511

[22] Filed: Nov. 28, 1984

[30] Foreign Application Priority Data

Dec. 17, 1983 [DE] Fed. Rep. of Germany ....... 3345661

[51] Int. Cl.⁴ .......................... F16D 7/02; H02K 7/18
[52] U.S. Cl. ........................................ 464/36; 310/78
[58] Field of Search .................. 192/56 R; 310/52, 53, 310/60 R, 62, 78, 90; 384/517; 464/10, 35, 36, 30

[56] References Cited

U.S. PATENT DOCUMENTS 2,974,504 3/1961 Johnson ................................ 464/35
4,463,275 7/1984 Ragaly ................................ 310/78

FOREIGN PATENT DOCUMENTS 2942737 5/1981 Fed. Rep. of Germany .
2073849 10/1981 United Kingdom ................. 464/10

Primary Examiner—Stuart S. Levy
Assistant Examiner—Daniel P. Stodola
Attorney, Agent, or Firm—Frishauf, Holtz, Goodman & Woodward

[57] ABSTRACT

To facilitate manufacture and increase the lifetime of a speed-dependent coupling between the ventilation or fan wheel (23) and drive shaft (18, 21) of the alternator, an inner race (25) is secured to the drive shaft, formed with two parallel running grooves (26, 27) in which two rows of balls (28, 29) are rolling. A pair of outer races is formed as ring-shaped elements (30, 31), of part-circular cross section, surrounding opposite, at least approximately quarter-circular zones of the balls, the outer races being axially biased towards each other by a pair of disk-shaped membranes (34, 35) to which the ventilation fan wheel (23) is attached, the membranes being biased towards each other by a biasing force (F), for example exerted by axial screws, securing the disk-shaped membranes together for resiliently biasing the ring-shaped elements towards each other and exerting axial pressure on the balls (28, 29) running in the grooves of the inner race and beneath the outer races. Sealing strips (50, 51, 52) can be placed between the membranes to prevent escape of lubricant of the coupling.

11 Claims, 5 Drawing Figures

FORCED AIR-COOLED VEHICULAR-TYPE ALTERNATOR

Reference to related patent, assigned to the assignee of the present application, the disclosure of which is hereby incorporated by reference:

U.S. Pat. No. 4,437,846, Mar. 20, 1984, RAGALY.

U.S. application, Ser. No. 416,592, Sept. 9, 1982, RAGALY, now U.S. Pat. No. 4,463,275, July 31, 1984.

The present invention relates to an alternator, and more particularly to an alternator which is adapted to be driven by an internal combustion engine of the automotive type, that is, an alternator which is driven under widely varying speed and loading conditions, and which has a fan wheel to provide for forced air cooling thereof.

BACKGROUND

It has previously been proposed to drive alternators directly from an output shaft of an internal combustion engine of the vehicular type; such engines operate under widely varying conditions of speed, and the alternator must provide its rated output under widely varying conditions of speed. Consequently, a fan blade attached to the alternator should provide for adequate cooling thereof under the widely varying speed and loading conditions. Yet, if the engine operates at high speed and the alternator is only lightly loaded, a fan wheel coupled directly to the alternator will rotate at excessively high speed, causing losses, that is, unnecessarily loading the engine, and, additionally, increasing the overall noise level of the vehicle. It has been proposed—see the referenced U.S. Pat. No. 4,437,846, RAGALY—to provide a friction coupling, between the rotor shaft of the alternator, which is directly coupled to the drive shaft thereof, and the hub of a fan wheel, which is so arranged that, if the speed of the alternator increases, slippage between the hub of the fan wheel and the alternator shaft will be permitted, so that the fan wheel or ventilator will not be driven at a speed in excess of a load limit thereon, although the shaft may rotate at higher speeds due to higher speed operation of the engine. In one such construction, two ball bearings are located on the shaft of the alternator, the inner races thereof being fitted on the shaft of the alternator, whereas the outer races are fitted into a bore of a hub forming an integral casting with the fan wheel. The outer race of the ball bearing which is closer to the end shield or end bell of the alternator is press-fitted in the hub; the outer race of the ball bearing which is closest to the drive pulley of the alternator is so arranged that it can slip in the bore of the hub, and thus accomodate differences in speed between the drive shaft and the ventilating wheel. It has been found that the customary casting material used for the fan blade wears under the slipping conditions and, after some operating time, may become loose in the hub, so that the torques transmitted by this coupling may vary from design values.

THE INVENTION

It is an object to improve a fan-force cooled vehicular-type alternator by providing a coupling between the fan wheel and the alternator which has a high lifetime and in which a previously adjusted transmission torque is retained, that is, such that the fan wheel will be carried along with the transmission shaft until a predetermined counter-torque from the fan wheel occurs, at which time the fan wheel will not operate at a speed proportional to that of the shaft, but retain its then set speed regardless of shaft speed.

Briefly, a pair of ball bearings are located next to each other, having two inner races formed on an inner ring element secured to the shaft. In accordance with the invention, a pair of outer races are provided, formed as ring-shaped elements of part-circular cross section surrounding at least opposite quarter-circular zones of balls operating in the two races, and retaining the balls in position in the races. A pair of disk-shaped membranes are secured to the ring-shaped elements, the membranes being held together and resiliently biasing the ring-shaped elements towards each other, thereby exerting axial pressure on the balls rolling in the grooves or the races, and restrained by the outer races.

The arrangement has the advantages that the lifetime of the coupling is commensurate with that of the alternator, that all elements which are subjected to frictional pressure can easily be made of readily available hardened material, and that the overall assembly is simple and inexpensive, so that the arrangement is easily applicable to mass production.

DRAWINGS

DETAILED DESCRIPTION

Figure 1:
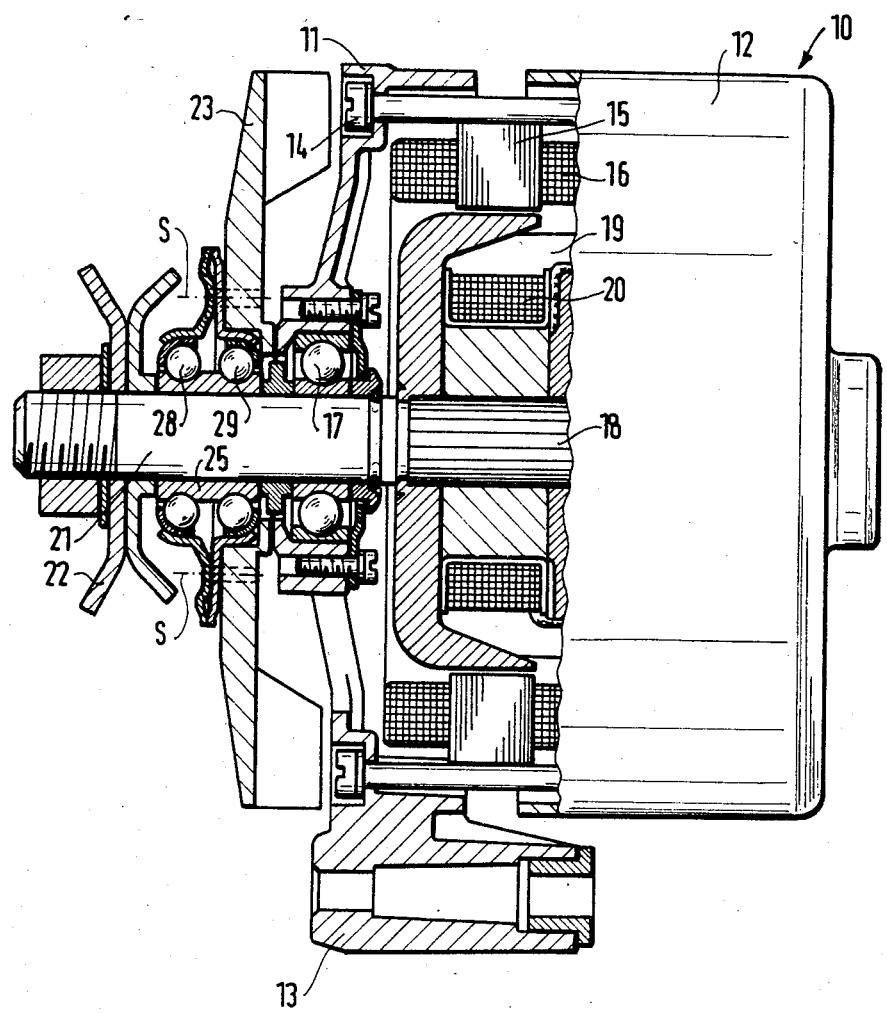
FIG. 1 is a side view, partly in section, of an automotive-type alternator of the claw-pole type, illustrating in detail only those portions necessary for an understanding of the present invention; the elements thereof not specifically illustrated and designated can all be conventional.

The alternator 10 has an end shield 11 positioned at the drive side of the alternator. A holding bracket 13 is secured to or integral with the end shield 11. The opposite end shield 12, formed as a cylindrical housing, covers the slip ring side of the alternator. A laminated stator stack has a winding 16 wound thereon; the stator stack is held in position by screws 14 passing through the end shield 11, 12 of the housing, and also forming a frame for the alternator. The winding 16, preferably, is a three-phase winding uniformly distributed over the circumference of the stator. A ball bearing 17 is fitted in the drive side end shield 11, retaining a main shaft 18 in position. Another ball bearing is fitted into the element 12 so that the shaft 18 will be positively guided. The shaft 18 carries an internal claw-pole rotor 19, the claw poles surrounding a field or excitation winding 20 wound on an axial core.

The alternator rotor structure formed by the shaft 18, the claw poles 19 and the field winding 20, is driven by a drive pulley 22 fitted on a stub extension 21 of the shaft 18, and adapted to be driven by an internal combustion engine (ICE) of the automotive type, that is, at widely varying speeds. The ratio of speed between lowest and highest may be 1:10. A fan wheel 23 is provided, located close to the drive side end shield 11 to suck air axially through the alternator through openings formed in the respective end shields; only the lower opening in end shield 11 is visible in FIG. 1. The fan or ventilator wheel 23 is secured to the stub extension 21 of the shaft 18.

The pulley 22 is securely attached, in driving connection, to the shaft 18, for example by an end nut, with interposed washers, or the like, as is well known and in accordance with any suitable construction. A coupling provides for transmission of rotation from the shaft 18, and hence from the pulley 22 to the fan wheel 23.

Figure 2:
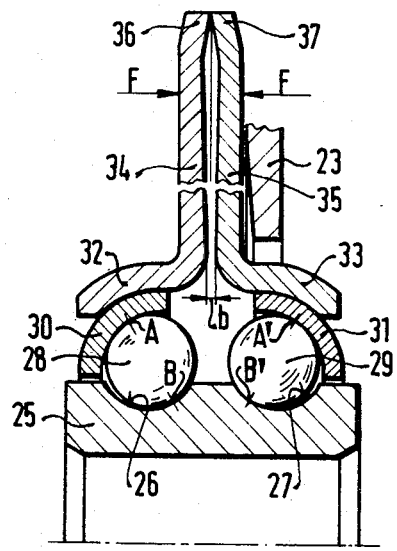
FIG. 2 is a fragmentary axial sectional view through the coupling arrangement for the fan wheel, to a greatly enlarged scale, and illustrating the principles of the present invention.

As best seen in FIG. 2, an inner race 25 is securely seated on the stub shaft 21 to rotate with the stub shaft 21. The inner race 25 is a standard mass-production ball bearing race, meeting, for example, standard dimensional specifications of a double-groove self-aligning ball bearing. The inner race 25 has two parallel ring-shaped grooves or races 26, 27 positioned axially closely adjacent each other. Balls 28, 29 run in the races or grooves 26, 27. The balls 28, 29 are radially outwardly retained and positioned by two bearing cups 30, 31 forming outer races. Each of the bearing cups has a part-circular cross section, and are press-fitted with their external circumference in a hub 32, 33. The hub 32, 33 forms the inner zone of a disk or dish-shaped spring membrane 34, 35, respectively. The two membranes 34, 35 are formed at their radially outwardly circumferences with facing offsets 36, 37, so that the membranes will be spaced from each other. Tensioning screws S (FIG. 1) positioned, for example, approximately at the level of the force arrows F, tension the membranes 34, 35 towards each other and, for example, further retain the membranes on the fan wheel 23. The attachment of the wheel 23 to the membranes, or one of them, may be independent of the tensioning screws S. The tensioning screws S are, preferably, distributed uniformly around the circumference of the ring-shaped membranes or disks 34, 35.

Upon appropriately tensioning the membranes 34, 35 towards each other, a space b (FIG. 2) will be left between the membranes at the region thereof close to the outer races 30, 31.

Operation

The tensioning force F biases the rows of balls 28, 29 towards each other in such a manner that their rotational movement will be on the conical surfaces shown at A, B and A', B', respectively in FIG. 2. A transfer torque, depending on the bias force F, and transferred to the balls via the hub portions 32, 33 and the outer races 30, 31, will thus be applied between the shaft 18 of the rotor, to which the inner race 25 is coupled, and the fan wheel 23, coupled to the disks or membranes 34, 35. As the speed of the shaft 18 increases, for example upon increased speed of a driving ICE, the reaction torque of the fan wheel 23 will increase with approximately the square of the speed. At an approximately median speed of the engine—that is, a speed between idling and maximum design value—the reaction torque will have reached the level at which the speed of the fan wheel can increase only very slightly, and the fan wheel will roll off on the balls with respect to the shaft and the inner race 25. The two spring membranes 34, 35 are arranged in mirror—image relationship with respect to each other; likewise, the hub portions 32, 33 are the mirror image of each other, and the outer races 30, 31 likewise can be identical, located in facing direction. This has the additional advantage of low manufacturing and assembling costs and, further, of low requirement for stocking and storing parts during manufacture and/or for repair or maintenance. The inner race 25 and the balls 26, 27 are all standard articles of manufacture; the outer races 30, 31 can readily be made of hard, wear-resistant material, at low cost.

Figure 3:
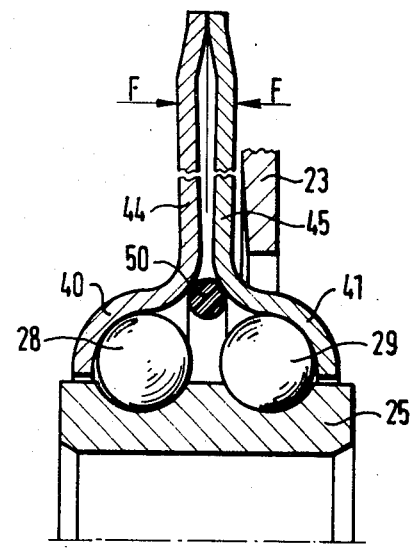
FIGS. 3, 4 and 5 are views similar to FIG. 2, and illustrating other embodiments and variations of the structure shown in FIG. 2.

Embodiment of FIG. 3: It is not necessary that the hub portions 32, 33 and the actual bearing races 30, 31 be separate; as shown in FIG. 3, the two bearing races 40, 41, fitting around the balls 28, 29, are integral with the spring membranes or disks 44, 45. FIG. 3 illustrates another improvement: Preferably, lubricant, such as grease, is retained in the space beneath the races 25 and 30, 31 (FIG. 2) or 25 and 40, 41 (FIG. 3), respectively. FIG. 3 illustrates a sealing ring 50 made of an elastic material, or of felt, which prevents lubricant for the balls 28, 29 from being flung outwardly by centrifugal force during operation of the alternator. Preferably, also, the outer races 40, 41, as the races 30, 31 (FIG. 2), are carried close to the outer circumference of the inner race 25 to prevent leakage of lubricant from the space beneath the outer races.

Figure 4:
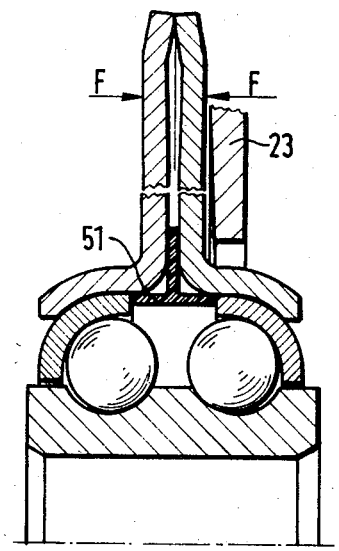
Figure 5:
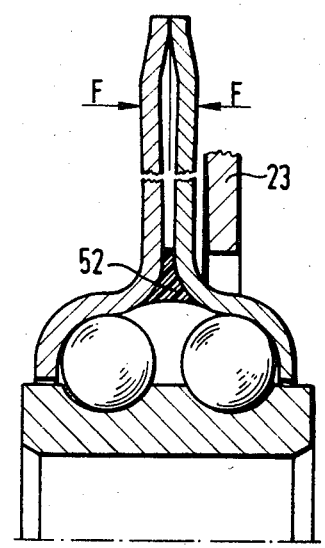

Embodiment of FIG. 4: The general structure of FIG. 4 is similar to that of FIG. 2, with the only difference being a sealing ring 51, of generally T-shaped cross section, being fitted between the outer races 30, 31 and into the gap b between the membranes 34, 35 in the region adjacent the inner races 30, 31. The T-shaped sealing strip, again, retains lubricant in the space surrounding the balls. FIG. 5 illustrates another embodiment of a sealing strip 52, applied in this case to the embodiment of FIG. 3 and, for example, formed as a vulcanized rubbery sealing lip, inserted and vulcanized between the membranes 44, 45 (FIG. 3) or, if used, between the outer races 30, 31 and the hub portions 32, 33 and the membranes 34, 35 (FIG. 2).

The coupling has the particular advantage that no sliding seat or friction seat is required, and thus has a long lifetime. Further, any frictional heat which is generated is readily transmitted by the outer races 30, 31 and the membrane portions 32, 33 and the membranes 34, 35 directed to the fan wheel 23 which, of course, is cooled and is cooling due to its rotation. Heat transmission is even improved in the embodiments of FIGS. 3 and 5, where the outer races 40, 41 and the membranes 44, 45 are an integral structure. The arrangement has the further advantage of small size. In manufacture, the tolerances need not be tight, since adjustment of the transmitted torque can be done after assembly by suitable tensioning of the attachment elements S, for example by screws. The bearing, and specifically the outer races and/or the membranes or disks, can be preassembled to a compact subassembly, for attachment to the fan wheel or ventilator or blade 23.

The attachment of the respective disk-shaped membranes 34, 35; 44, 45 to the fan wheel 23 may be in accordance with any other conventional manner, for example by spot-welding the fan wheel 23 to the respectively adjacent membranes 35, 45; the force F can also be exerted, for example, by rivets.

Various changes and modifications may be made, and features described in connection with any one of the embodiments may be used with any of the others, within the scope of the inventive concept.

I claim:

1. Forced air-cooled vehicular-type alternator having
   a frame (10, 11);
   a main shaft (18, 21);
   a bearing (17) secured in the frame and journalling the main shaft;

a drive wheel (22) secured to the shaft for coupling to an engine operating at speeds varying over a wide range;

a forced ventilation fan wheel (23) positioned concentrically with the shaft;

and a speed-dependent coupling for coupling the fan wheel for rotation with the shaft at low ranges of speed but permitting slippage of the shaft and fan wheel at high speeds of the shaft, including an inner bearing race (25) secured to the main shaft (18, 21) and having two running grooves (26, 27) therein, and two parallel rows of balls (28, 29) rolling in the grooves, comprising, in accordance with the invention, a pair of outer races formed as ring-shaped elements (30, 31; 40, 41) of part-circular cross section surrounding opposite at least approximately quarter-circular zones of the balls (28, 29) and retaining the balls in the outer races;

a pair of disk-shaped membranes (34, 35; 44, 45), each holding a ring-shaped element (30, 31);

and means (S) for securing the disk-shaped membranes together and for resiliently biasing (F) the ring-shaped elements axially towards each other for exerting axial pressure on the balls (28, 29) rolling in the grooves, and restrained by the outer races.

2. Alternator according to claim 1, wherein (FIG. 3) the outer races (40, 41) and said disk-shaped membranes (44, 45) comprise unitary elements.

3. Alternator according to claim 2, wherein the outer races extend radially close to the inner bearing race (25).

4. Alternator according to claim 3, wherein the disk-shaped membranes, in the region close to the outer races, are spaced by an axial gap (b);

and wherein a sealing ring (50, 51, 52) is provided located in said gap to prevent escape of lubricant for the balls (28, 29) running in the grooves (26, 27) and within the outer races.

5. Alternator according to claim 2, wherein the disk-shaped membranes, in the region close to the outer races, are spaced by an axial gap (b);

and wherein a sealing ring (50, 51, 52) is provided located in said gap to prevent escape of lubricant for the balls (28, 29) running in the grooves (26, 27) and within the outer races.

6. Alternator according to claim 1, wherein the outer races extend radially close to the inner bearing race (25).

7. Alternator according to claim 6, wherein the disk-shaped membranes, in the region close to the outer races, are spaced by an axial gap (b);

and wherein a sealing ring (50, 51, 52) is provided located in said gap to prevent escape of lubricant for the balls (28, 29) running in the grooves (26, 27) and within the outer races.

8. Alternator according to claim 1, wherein the disk-shaped membranes, in the region close to the outer races, are spaced by an axial gap (b);

and wherein a sealing ring (50, 51, 52) is provided located in said gap to prevent escape of lubricant for the balls (28, 29) running in the grooves (26, 27) and within the outer races.

9. Alternator according to claim 1, wherein the disk-shaped membranes are extending radially essentially parallel to the ventilation fan wheel, and are formed with a radially outwardly positioned offset portion (36, 37), the disk-shaped elements being identical structures assembled in mirror-image relationship;

at least one of said disk-shaped membranes being secured to the fan wheel (23).

10. Alternator according to claim 9, wherein said means/for securing the disk-shaped membranes together is adjustable, and, simultaneously, forms the attachment of the membranes to the ventilation fan wheel (23).

11. Alternator according to claim 1, wherein the means (S) for securing the disk-shaped membranes together is adjustable to provide for controlled adjustment of the axial pressure being exerted on the ball and hence the transfer torque exerted via the balls running in the respective races between the inner and outer races.

* * * * *